(12) United States Patent
Takizawa et al.

(10) Patent No.: US 10,339,668 B2
(45) Date of Patent: Jul. 2, 2019

(54) OBJECT RECOGNITION APPARATUS

(71) Applicant: FANUC CORPORATION, Yamanashi (JP)

(72) Inventors: Shouta Takizawa, Yamanashi (JP); Junichirou Yoshida, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/951,739

(22) Filed: Apr. 12, 2018

(65) Prior Publication Data

US 2018/0315210 A1    Nov. 1, 2018

(30) Foreign Application Priority Data

Apr. 26, 2017    (JP) .................................. 2017-086870

(51) Int. Cl.
*G06K 9/00*    (2006.01)
*G06T 7/70*    (2017.01)

(52) U.S. Cl.
CPC ............ *G06T 7/70* (2017.01); *G06K 9/00201* (2013.01); *G06K 2209/19* (2013.01); *G06T 2207/10012* (2013.01)

(58) Field of Classification Search
None
See application file for complete search history.

(56) References Cited

U.S. PATENT DOCUMENTS

2004/0080758 A1    4/2004  Ban et al.
2011/0218675 A1    9/2011  Ban et al.
(Continued)

FOREIGN PATENT DOCUMENTS

CN    103020952 A    4/2013
EP    1413850 A2    4/2004
(Continued)

OTHER PUBLICATIONS

Decision to Grant a Patent dated Sep. 18, 2018, for Japanese Patent Application No. 2017-086870.
(Continued)

*Primary Examiner* — Sean M Conner
(74) *Attorney, Agent, or Firm* — Karceski IP Law, PLLC

(57) ABSTRACT

An object recognition apparatus includes a two-dimensional sensor for acquiring two-dimensional information of an object at a first clock time, a three-dimensional sensor for acquiring three-dimensional information of the object at a second clock time, a storage unit that associates and stores a first position of the two-dimensional sensor and the two-dimensional information, and a second position of the three-dimensional sensor and the three-dimensional information, and an arithmetic operation unit that calculates the amount of change in orientation between the orientation of the two-dimensional sensor and the orientation of the three-dimensional sensor based on the stored first position and second position, that converts the three-dimensional information acquired at the second position into three-dimensional information acquired at the first position based on the calculated amount of change in orientation, and that calculates the state of the object based on the converted three-dimensional information and the two-dimensional information.

4 Claims, 6 Drawing Sheets

(56) References Cited

U.S. PATENT DOCUMENTS

| | | | |
|---|---|---|---|
| 2012/0048628 | A1 | 3/2012 | Kawanami et al. |
| 2013/0011018 | A1 | 1/2013 | Tateno et al. |
| 2013/0114861 | A1 | 5/2013 | Takizawa |
| 2013/0238128 | A1 | 9/2013 | Suzuki |
| 2016/0110878 | A1* | 4/2016 | Chang ................... G06T 7/73 382/103 |
| 2017/0154204 | A1 | 6/2017 | Ryu et al. |
| 2018/0075618 | A1 | 3/2018 | Lai et al. |
| 2018/0300950 | A1* | 10/2018 | Chang ................... G06T 7/55 |

FOREIGN PATENT DOCUMENTS

| | | | |
|---|---|---|---|
| EP | 2543483 | A1 | 1/2013 |
| EP | 2636493 | A2 | 9/2013 |
| JP | 2004144557 | | 5/2004 |
| JP | 4837116 | B2 | 12/2011 |
| JP | 2012047460 | | 3/2012 |
| JP | 2012-168788 | A | 9/2012 |
| JP | 2013101045 | | 5/2013 |
| JP | 2013186088 | | 9/2013 |
| WO | 2017095576 | A1 | 6/2017 |

OTHER PUBLICATIONS

Chinese Office Action dated Mar. 13, 2019, for Chinese Patent Application No. 201810343562.4.

* cited by examiner

OBJECT RECOGNITION APPARATUS

CROSS-REFERENCE TO RELATED APPLICATIONS

This application is based on and claims priority to Japanese Patent Application No. 2017-086870, filed on Apr. 26, 2017, the entire content of which is incorporated herein by reference.

FIELD OF THE INVENTION

The present invention relates to an object recognition apparatus.

BACKGROUND OF THE INVENTION

There is a known technology in which three-dimensional information of an object is acquired by projecting a pattern onto the object and acquiring an image, two-dimensional information of the object is acquired by acquiring an image without projecting a pattern, and the position and orientation of the object are obtained by combining the acquired two-dimensional information and three-dimensional information (refer to, for example, Japanese Unexamined Patent Application, Publication No. 2013-101045).

SUMMARY OF THE INVENTION

The present invention provides the following solutions.

One aspect of the present invention is an object recognition apparatus including: a two-dimensional sensor for acquiring two-dimensional information of an object at a first clock time; a three-dimensional sensor for acquiring three-dimensional information of the object at a second clock time; a storage unit that associates and stores a first position of the object or the two-dimensional sensor at the first clock time and the two-dimensional information and that associates and stores a second position of the object or the three-dimensional sensor at the second clock time and the three-dimensional information; and an arithmetic operation unit that calculates the amount of change in orientation between the orientation of the two-dimensional sensor at the first position and the orientation of the three-dimensional sensor at the second position on the basis of the first position and the second position stored in the storage unit, that converts the three-dimensional information acquired at the second position into three-dimensional information acquired at the first position on the basis of the calculated amount of change in orientation, and that calculates a state of the object on the basis of the converted three-dimensional information and the two-dimensional information.

DESCRIPTION OF EMBODIMENT(S) OF THE INVENTION

An object recognition apparatus 1 according to one embodiment of the present invention will now be described with reference to the drawings.

Figure 1:
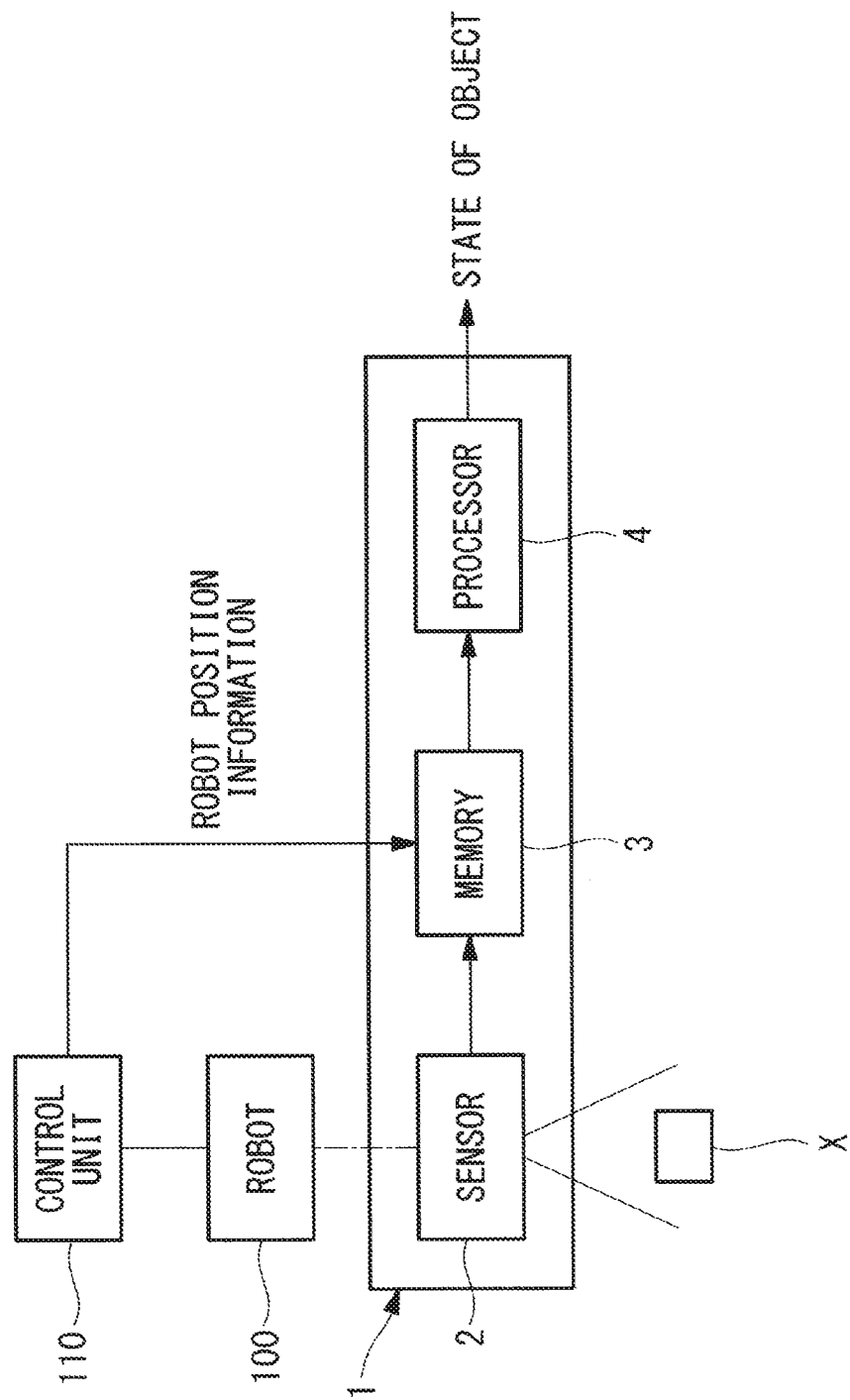
FIG. 1 is a block diagram showing an object recognition apparatus according to one embodiment of the present invention.

As shown in FIG. 1, the object recognition apparatus 1 according to this embodiment includes: a sensor (two-dimensional sensor and three-dimensional sensor) 2 that is attached to the end of the wrist of a robot 100 and that acquires, at different clock times, two-dimensional information and three-dimensional information of an object X that is fixed outside the robot 100; a memory (storage unit) 3 for storing the two-dimensional information and the three-dimensional information of the object X acquired by the sensor 2 at respective clock times so as to be associated with robot position information (hereinafter, referred to simply as position information) of the robot 100 at the respective clock times; and a processor (arithmetic operation unit) 4 for recognizing at least one of the shape, the position, and the orientation of the object X on the basis of the two-dimensional information, the three-dimensional information, and the position information of the robot 100 stored in the memory 3. In the figure, reference sign 110 denotes a control unit that controls the robot 100 and that transmits the position information to the memory 3.

The sensor 2 employs a method capable of selectively acquiring one of the two-dimensional information and the three-dimensional information at a time. Therefore, two-dimensional information and three-dimensional information of the object X cannot be acquired in the same direction, namely, information is acquired only in different directions, in a case where such information is acquired while the robot 100 is being operated and moved. The sensor 2 acquires a two-dimensional image as the two-dimensional information and distance information as the three-dimensional information.

The processor 4 calculates the position of the sensor 2 when two-dimensional information was acquired (first position) and the position of the sensor 2 when three-dimensional information was acquired (second position) on the basis of the position information of the robot 100 that was stored in the memory 3 when the two-dimensional information and the three-dimensional information were acquired and, on the basis of the obtained two positions, calculates the amount of change in orientation of the sensor 2 between the two positions. The amount of change in orientation is calculated from, for example, the amount of shift in the form of a 4×4 matrix containing the amounts of rotation in three directions.

The processor 4 converts the three-dimensional information acquired at the second position into three-dimensional information corresponding to the first position by multiplying the calculated amount of change in orientation by the three-dimensional information stored in the memory 3. Then, the processor 4 calculates the state of the object X composed of at least one of the shape, position, and orientation of the object X on the basis of the converted three-dimensional information and the two-dimensional information.

Figure 2:
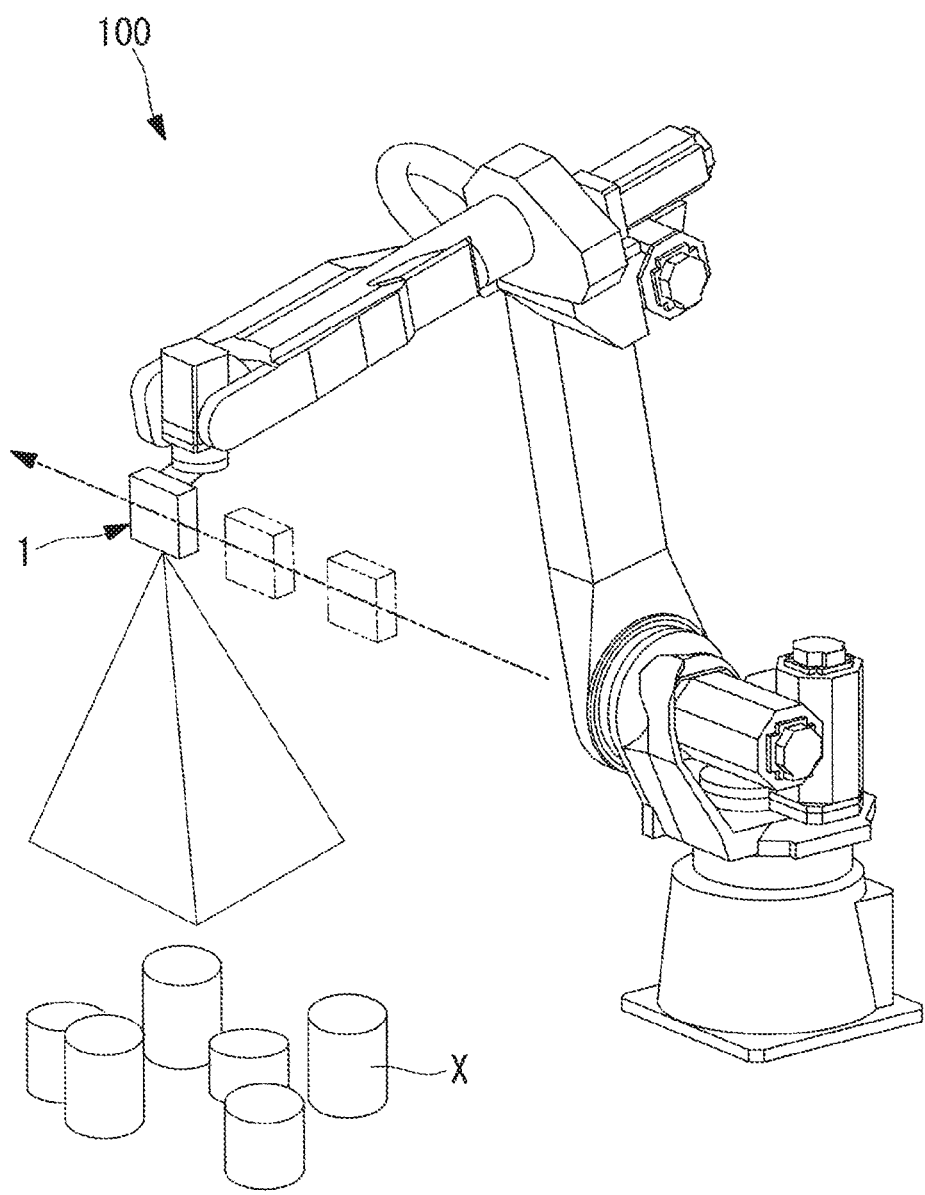
FIG. 2 is a perspective view showing a case where an object is recognized by mounting a sensor of the object recognition apparatus in FIG. 1 on a robot.

According to the object recognition apparatus 1 of this embodiment with the above-described structure, there is an advantage in that while the sensor 2 is being moved with the robot 100 through control of the robot 100 using the control unit 110 as show in FIG. 2, the three-dimensional information acquired at a clock time different from the clock time at which the two-dimensional information was acquired is converted, on the basis of the amount of change in orientation of the sensor 2, into three-dimensional information that would be acquired at the first position at which the two-dimensional information was acquired, and therefore, the state of the object X can be recognized with high accuracy by associating the two-dimensional information, which is planar information, with the three-dimensional information, which is stereoscopic information, with high accuracy.

Figure 3:
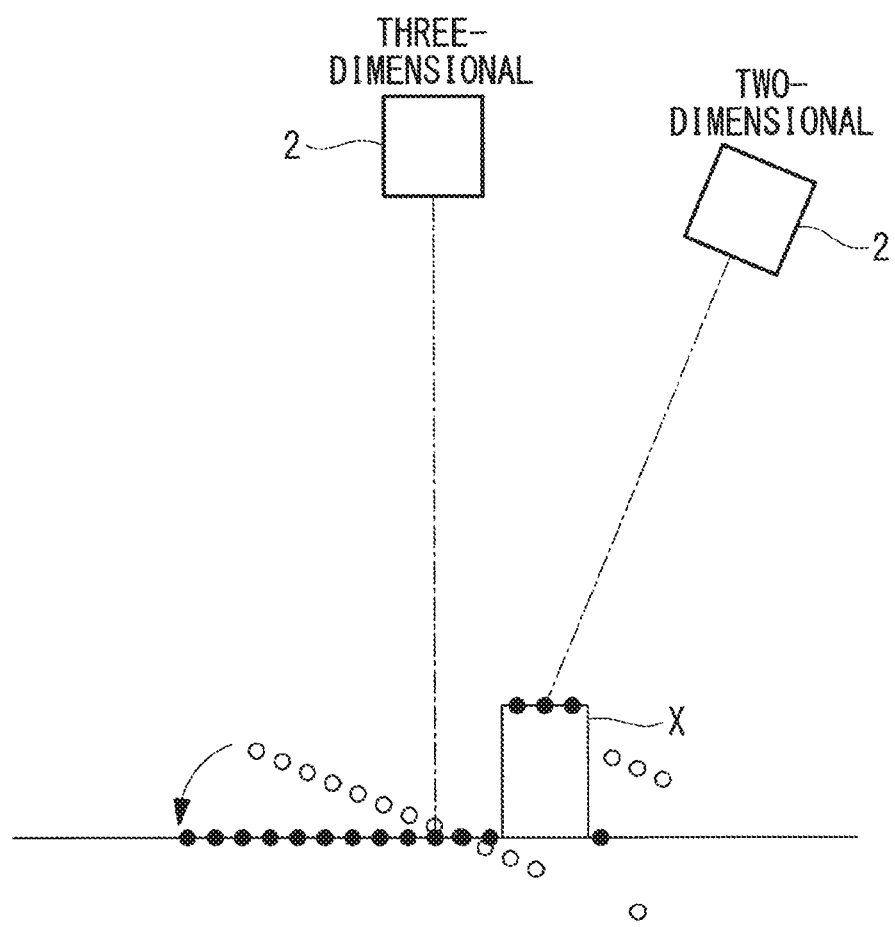
FIG. 3 is a diagram for illustrating the recognition of an object using the object recognition apparatus in FIG. 1.

As show in, for example, FIG. 3, when two-dimensional information of an area including the object X is acquired at a first clock time from obliquely above the object X and thereafter, three-dimensional information of the area including the object X is acquired at a second clock time from vertically above the object X after the sensor 2 has been moved with the robot 100, the straight line (line of sight (LOS)) extending in the detection direction of the sensor 2 shifts and rotates between the two detection positions.

In the figure, the black-filled plot indicates three-dimensional information acquired with the sensor 2, and the open plot indicates a case where the two-dimensional information is overlaid with the acquired three-dimensional information as is.

According to the object recognition apparatus 1 of this embodiment, the open plot can be converted into the three-dimensional information corresponding to each position in the two-dimensional information by restoring the open plot to the positions of the black-filled plot using the amount of change in orientation.

In other words, there is an advantage in that even if two-dimensional information and three-dimensional information of the object X are acquired in different directions, the shape, position, and orientation of the object X can be recognized with high accuracy, making it possible to recognize the state of the object X while the robot 100 is being moved at high speed.

In this case, there is an advantage in that because the object X is recognized by combining its two-dimensional information and three-dimensional information, the amount of three-dimensional information to be used to recognize the state of the object X can be suppressed to the minimum compared with a case where the object X is recognized only from three-dimensional information consisting of a huge amount of information, thereby making it possible to dramatically reduce the memory capacity and the amount of processing performed by the processor and to recognize the state of the object X in real time even while the robot 100 is being moved at high speed.

Although the two-dimensional information is acquired at the first clock time and the three-dimensional information is acquired at the later second clock time in this embodiment, the acquisition order may be reversed.

In addition, although this embodiment has been described by way of an example where two-dimensional information and three-dimensional information are acquired at different single points, instead of this, the present invention may be applied to a case where the object X is recognized at a plurality of positions along the route of movement of the sensor 2 resulting from the operation of the robot 100.

Figure 4:
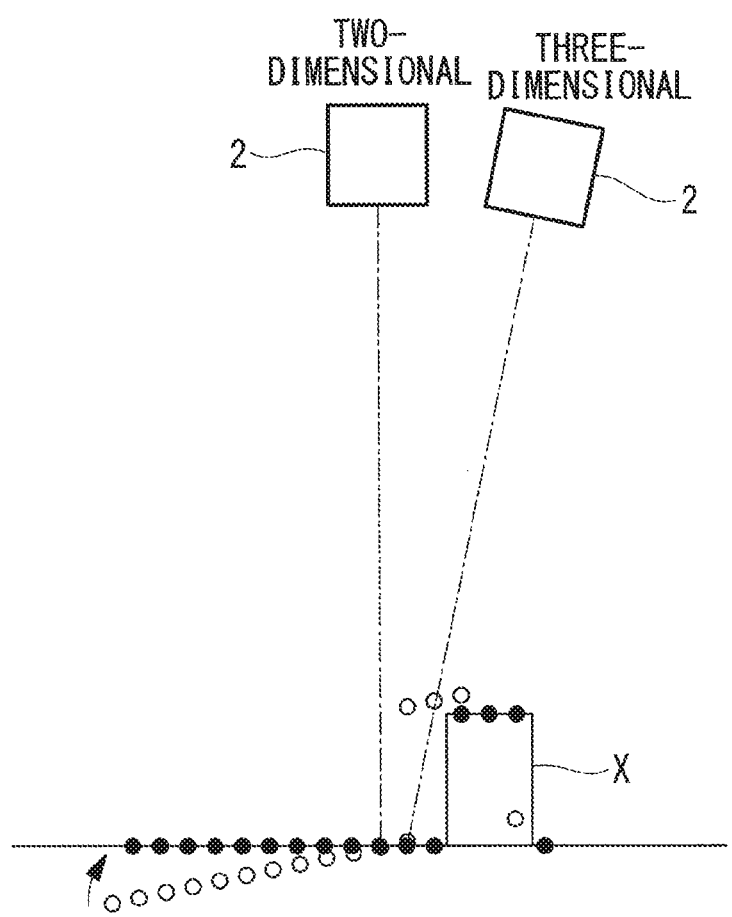
FIG. 4 is a diagram for illustrating the recognition of an object using a first modification of the object recognition apparatus in FIG. 1.
Figure 5:
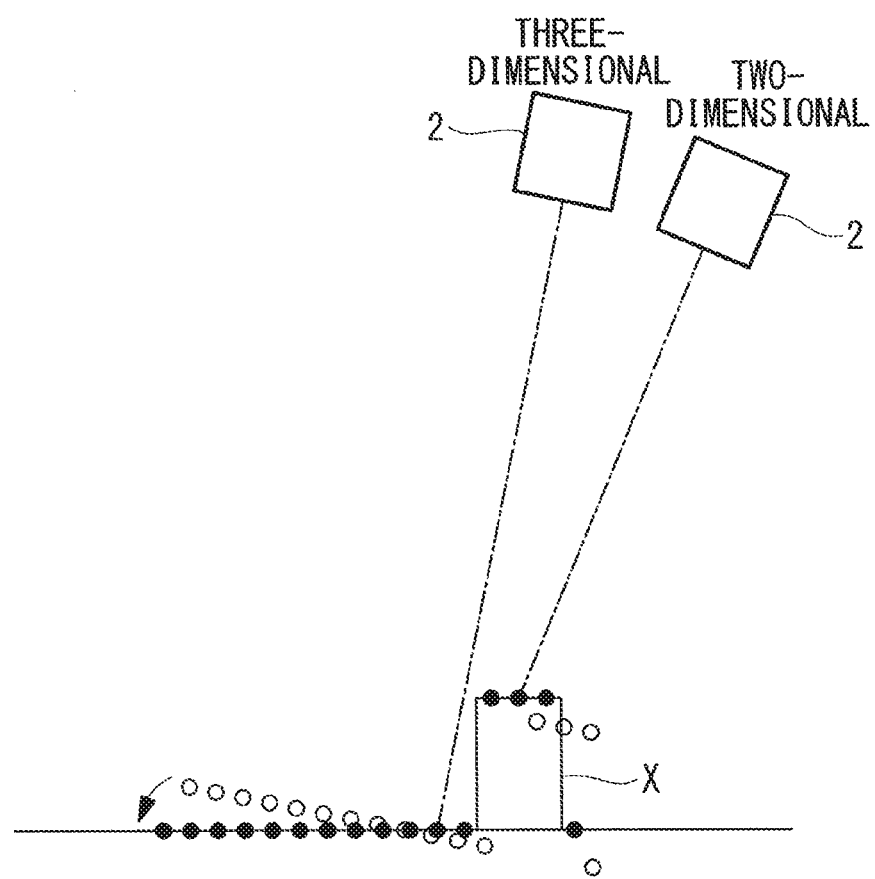
FIG. 5 is a diagram continued from FIG. 4 for illustrating the recognition of the object.

In this case, as show in FIGS. 4 and 5, two-dimensional information and three-dimensional information may be alternately acquired in a time series, so that three-dimensional information calculated by using the two-dimensional information and three-dimensional information acquired at neighboring clock times may be associated with the two-dimensional information.

As show in, for example, FIG. 4, on the basis of the two-dimensional information acquired at the first clock time and the three-dimensional information acquired at the second clock time, the three-dimensional information acquired at the second clock time is converted into three-dimensional information equivalent to information that would be acquired at the first clock time, and then the converted three-dimensional information is associated with the two-dimensional information. Next, as show in FIG. 5, on the basis of the three-dimensional information acquired at the second clock time and the two-dimensional information acquired at a third clock time, the three-dimensional information acquired at the second clock time is converted into three-dimensional information equivalent to information that would be acquired at the third clock time, and then the converted three-dimensional information is associated with the two-dimensional information. By doing so, the object can be recognized in more detail by associating the three-dimensional information converted from the three-dimensional information acquired between the two items of two-dimensional information with the two items of two-dimensional information.

In addition, although conversion is performed so as to associate three-dimensional information with two-dimensional information in this embodiment, in addition to this, conversion may be performed so as to associate two-dimensional information with three-dimensional information. By doing so, there is an advantage in that two-dimensional information and three-dimensional information can be associated at both of the acquisition position of the two-dimensional information and the acquisition position of the three-dimensional information, so that the object X can be recognized in more detail along the route of movement of the sensor 2 resulting from the operation of the robot 100.

Figure 6:
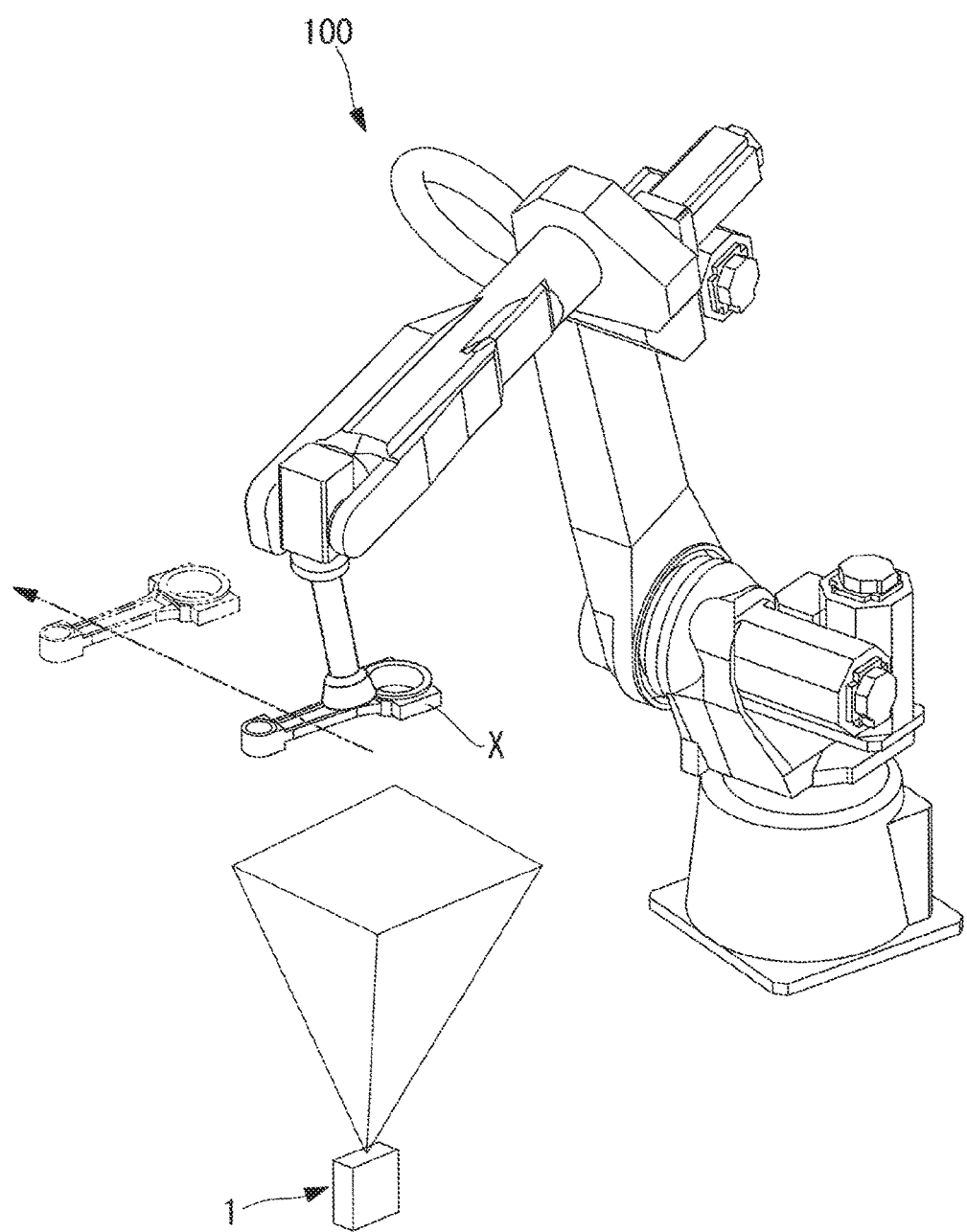
FIG. 6 is a perspective view showing a case where recognition is performed in a state where the sensor of the object recognition apparatus in FIG. 1 is fixed and the object is attached to the robot.

In addition, although this embodiment has been described by way of an example where the sensor 2 is moved relatively to the object X with the sensor 2 being attached to the robot 100, instead of this, the present invention may be applied to a case where the sensor 2 is fixed outside the robot 100, the object X is mounted on the robot 100, and the object X is moved relatively to the sensor 2, as show in FIG. 6.

In addition, although this embodiment has been described assuming a case where the sensor 2 is moved through the operation of the robot 100, instead of this, the present invention may be applied to a case where the object X is moved using a transport mechanism, such as a conveyer belt, with the sensor 2 being immobilized. In this case, it is advisable that the amount of change in orientation be calculated on the basis of the position information (information about the displacement) of the object X detected by a position sensor, such as an encoder, provided in the transport mechanism.

Furthermore, although this embodiment has been described by way of an example where the sensor 2 is realized by a sensor capable of alternatively switching between the acquisition of two-dimensional information and the acquisition of three-dimensional information, instead of this, a two-dimensional sensor for detecting two-dimensional information and a three-dimensional sensor for detecting three-dimensional information may be provided individually and used with both the sensors being fixed so as to have a predetermined positional relationship.

As a result, the above-identified embodiment leads to the following aspect.

One aspect of the present invention is an object recognition apparatus including: a two-dimensional sensor for acquiring two-dimensional information of an object at a first clock time; a three-dimensional sensor for acquiring three-dimensional information of the object at a second clock time; a storage unit that associates and stores a first position of the object or the two-dimensional sensor at the first clock time and the two-dimensional information and that associates and stores a second position of the object or the three-dimensional sensor at the second clock time and the three-dimensional information; and an arithmetic operation unit that calculates the amount of change in orientation between the orientation of the two-dimensional sensor at the first position and the orientation of the three-dimensional sensor at the second position on the basis of the first position and the second position stored in the storage unit, that converts the three-dimensional information acquired at the second position into three-dimensional information acquired at the first position on the basis of the calculated amount of change in orientation, and that calculates a state of the object on the basis of the converted three-dimensional information and the two-dimensional information.

According to this aspect, the two-dimensional information of the object acquired by the two-dimensional sensor at the first clock time is stored in the storage unit so as to be associated with the first position of the two-dimensional sensor at the first clock time, and the three-dimensional information of the object acquired by the three-dimensional sensor at the second clock time is stored in the storage unit so as to be associated with the second position of the three-dimensional sensor at the second clock time.

The arithmetic operation unit calculates the amount of change in orientation between the orientation of the two-dimensional sensor at the first position and the orientation of the three-dimensional sensor at the second position, converts the three-dimensional information acquired at the second position into the three-dimensional information acquired at the first position on the basis of the calculated amount of change in orientation, and calculates the state of the object on the basis of the converted three-dimensional information and the two-dimensional information.

In a case where two-dimensional information and three-dimensional information are sequentially acquired at different clock times while either one of the object; and the two-dimensional sensor and the three-dimensional sensor is being moved relatively to the other, the two-dimensional information and three-dimensional information are acquired in different directions of the object. According to this aspect, because the three-dimensional information acquired at the second position is converted into three-dimensional information acquired at the first position by calculating the amount of change in orientation between the two-dimensional sensor and the three-dimensional sensor, the two-dimensional information and the three-dimensional information can be made substantially equivalent to the information that would be acquired if the object were viewed in the same direction, thus, on the basis of this, making it possible to calculate at least one state of the shape, the position, and the orientation of the object with high accuracy.

In the above-described aspect, the object may be fixed, the two-dimensional sensor and the three-dimensional sensor may be attached to a robot, and the first position and the second position may be calculated on the basis of position information of the robot at the first clock time and the second clock time.

By doing so, the two-dimensional sensor and three-dimensional sensor move as a result of the robot being operated, and hence if the position information of the robot at the first clock time and the second clock time can be acquired, the first position and the second position can be calculated with high accuracy, thereby making it possible to calculate the state of the object with high accuracy.

In addition, in the above-described aspect, the two-dimensional sensor and the three-dimensional sensor may be fixed, the object may be conveyed by a transport mechanism, and the first position and the second position may be calculated on the basis of information about the displacement of the transport mechanism between the first clock time and the second clock time.

By doing so, although the first position and the second position change as a result of the object being conveyed by the transport mechanism relative to the fixed two-dimensional sensor and three-dimensional sensor, the first position and the second position can be calculated with high accuracy and thus the state of the object can be calculated with high accuracy if information about the displacement of the transport mechanism can be acquired.

In addition, in the above-described aspect, acquisition of the two-dimensional information by the two-dimensional sensor and acquisition of the three-dimensional information by the three-dimensional sensor may be alternately performed, and the arithmetic operation unit may calculate the state of the object on the basis of the two-dimensional information and the three-dimensional information acquired at neighboring clock times.

By doing so, as three-dimensional information to be associated with the two-dimensional information acquired at each first position, the three-dimensional information acquired at a closer second position can be used. As a result, the time intervals at which two-dimensional information is acquired can be made short, so that the state of the object can be recognized in more detail along the route of relative movement between the object and the two-dimensional sensor and between the object and the three-dimensional sensor.

The present invention affords an advantage in that the position and orientation of an object can be calculated with high accuracy even if a sensor is moving relatively to the object or the object is moving relatively to the sensor.

The invention claimed is:

1. An object recognition apparatus comprising:
   a two-dimensional sensor for acquiring two-dimensional information of an object at a first clock time;
   a three-dimensional sensor for acquiring three-dimensional information of the object at a second clock time;
   a storage unit that associates and stores a first position of the two-dimensional sensor at the first clock time and the two-dimensional information and that associates and stores a second position of the three-dimensional sensor at the second clock time and the three-dimensional information; and
   an arithmetic operation unit that calculates an amount of change in orientation between the orientation of the two-dimensional sensor at the first position and the orientation of the three-dimensional sensor at the second position on the basis of the first position and the second position stored in the storage unit, that converts the three-dimensional information acquired at the second position into three-dimensional information acquired at the first position on the basis of the calculated amount of change in orientation, and that calculates a state of the object on the basis of the converted three-dimensional information and the two-dimensional information.

2. The object recognition apparatus according to claim 1, wherein
the object is fixed,
the two-dimensional sensor and the three-dimensional sensor are attached to a robot, and
the first position and the second position are calculated on the basis of position information of the robot at the first clock time and the second clock time.

3. The object recognition apparatus according to claim 1, wherein
the two-dimensional sensor and the three-dimensional sensor are fixed,
the object is conveyed by a transport mechanism, and
the first position and the second position are calculated on the basis of information about the displacement of the transport mechanism between the first clock time and the second clock time.

4. The object recognition apparatus according to claim 1, wherein
acquisition of the two-dimensional information by the two-dimensional sensor and acquisition of the three-dimensional information by the three-dimensional sensor are alternately performed, and
the arithmetic operation unit calculates the state of the object on the basis of the two-dimensional information and the three-dimensional information acquired at neighboring clock times.

\* \* \* \* \*